(12) United States Patent
Kaneko et al.

(10) Patent No.: US 10,439,465 B2
(45) Date of Patent: Oct. 8, 2019

(54) ELECTRIC POWER UNIT

(71) Applicant: HONDA MOTOR CO., LTD., Tokyo (JP)

(72) Inventors: Nobuyuki Kaneko, Wako (JP); Shunichiro Sueyoshi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 105 days.

(21) Appl. No.: 15/455,468

(22) Filed: Mar. 10, 2017

(65) Prior Publication Data

US 2017/0271941 A1    Sep. 21, 2017

(30) Foreign Application Priority Data

Mar. 15, 2016  (JP) .................................. 2016-051624

(51) Int. Cl.
*H02K 5/22* (2006.01)
*H02K 9/06* (2006.01)
*H02K 11/33* (2016.01)

(52) U.S. Cl.
CPC ................. *H02K 5/22* (2013.01); *H02K 9/06* (2013.01); *H02K 11/33* (2016.01)

(58) Field of Classification Search
CPC . Y02T 10/7005; Y02T 10/7077; Y02T 10/70; B60W 10/08; B60W 20/00
USPC ........................................................ 318/139
See application file for complete search history.

(56) References Cited

U.S. PATENT DOCUMENTS

| 2011/0139531 A1* | 6/2011 | Kanno | B60L 3/0023 180/220 |
| 2012/0159978 A1* | 6/2012 | Shih | B60H 1/00278 62/180 |
| 2016/0301116 A1* | 10/2016 | Ochiai | H01M 10/0525 |
| 2016/0318499 A1* | 11/2016 | Yamanaka | B60W 10/06 |

FOREIGN PATENT DOCUMENTS

| JP | 2010-105492 A | 5/2010 |
| JP | WO-2011/121757 A1 * | 10/2011 |
| JP | 2012-064724 | 3/2012 |
| JP | 2012064724 A * | 3/2012 |
| JP | 2014-050132 | 3/2014 |
| WO | 2011/121757 | 10/2011 |

OTHER PUBLICATIONS

European Search Report dated Jul. 26, 2017, 7 pages.
European Search Report dated Jul. 27, 2017, 8 pages.
Co-pending U.S. Appl. No. 15/455,455, filed Mar. 10, 2017, 31 pages.
U.S. Office Action dated Apr. 5, 2019 from co-pending U.S. Appl. No. 15/455,455, 8 pages.

* cited by examiner

*Primary Examiner* — Kawing Chan
*Assistant Examiner* — Bradley Brown
(74) *Attorney, Agent, or Firm* — Rankin, Hill & Clark LLP

(57) ABSTRACT

An electric power unit having a heat emitting component includes a battery case provided in an extension direction of an output shaft of the motor, and spaced apart from the motor case, and a cooling fan provided between the battery case and the motor case. The battery case includes a discharge port formed at a position facing the cooling fan, and a suction port provided at a position spaced apart from the discharge port.

7 Claims, 13 Drawing Sheets

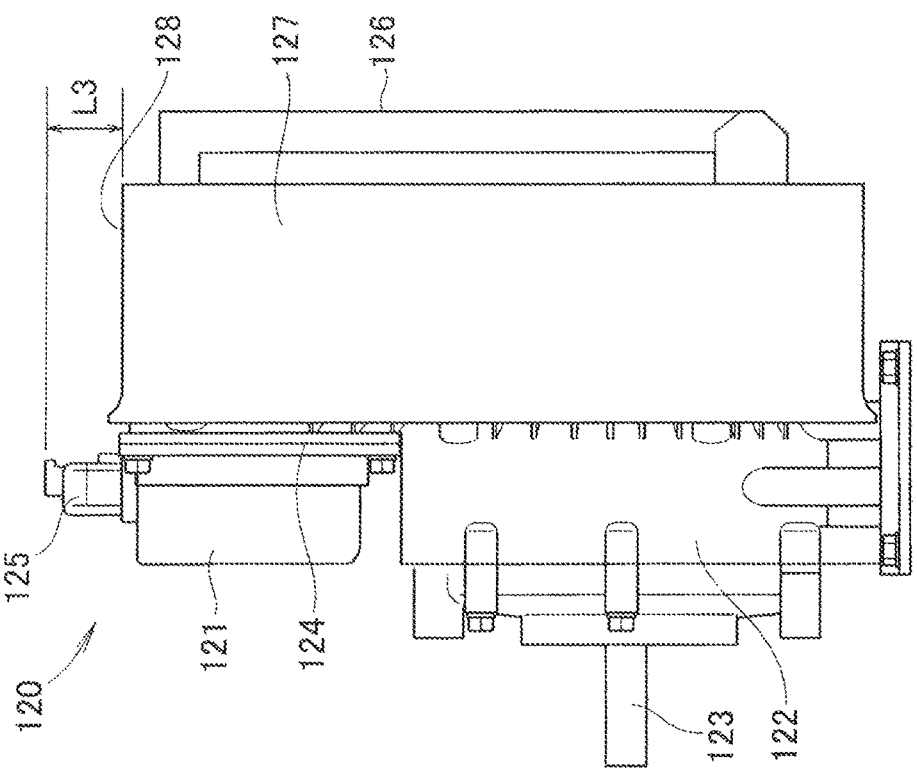
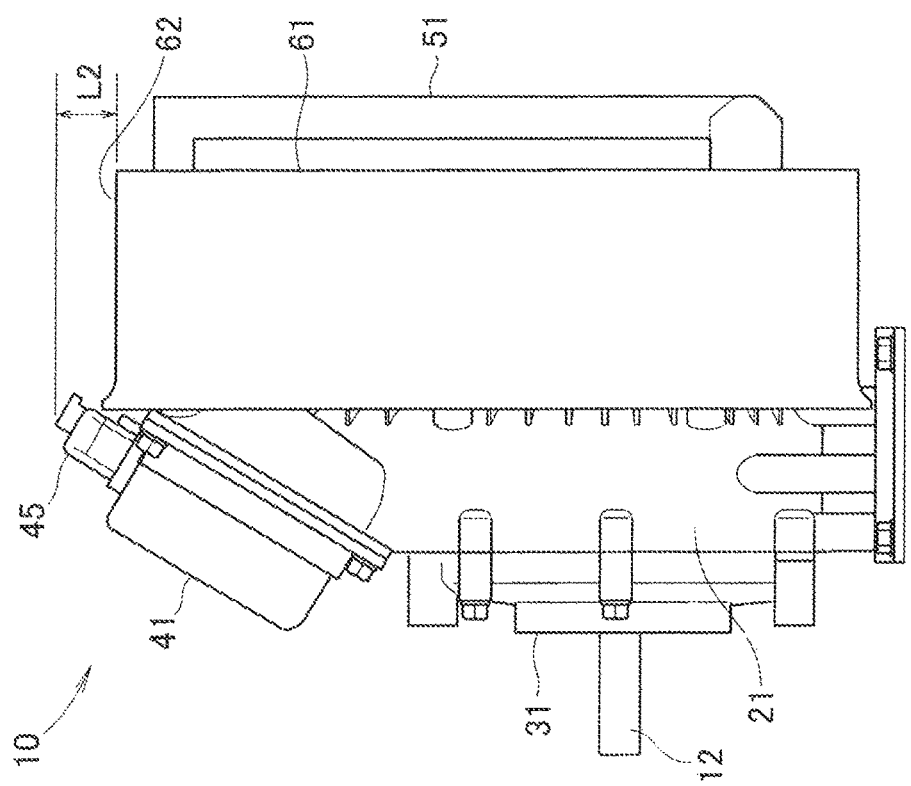

ELECTRIC POWER UNIT

CROSS-REFERENCE TO RELATED APPLICATION

This application is based upon and claims the benefit of priority from Japanese Patent Application No. 2016-051624 filed on Mar. 15, 2016, the contents of which are incorporated herein by reference.

BACKGROUND OF THE INVENTION

Field of the Invention

The present invention relates to motor case structure of an electric power unit.

Description of the Related Art

Examples of the power unit include an internal combustion engine for obtaining power by combusting a fuel, and an electric motor for obtaining power by electricity. In recent years, the electric power unit for obtaining power by electricity has been drawing attention in consideration of the environment and noise reduction. As an example of such an electric power unit, a technique described in Japanese Laid-Open Patent Publication No. 2014-050132 is known.

The basic principle of the technique disclosed in Japanese Laid-Open Patent Publication No. 2014-050132 will be described with reference to FIG. 12.

According to the disclosure, as shown in FIG. 12, electrical energy is supplied to an electric motor 100 from the outside through a terminal 101. A rotation shaft 103 is rotated by driving a motor 102 using the supplied electrical energy. Rotation of this rotation shaft 103 is decelerated by a decelerator 104, and in the decelerated state, the rotation is outputted.

In this regard, it may be considered to provide the motor 102 together with a battery and a driver to form a unit of an electric motor, and use the unit of the electric motor in various applications. That is, it may be considered to use the unit of the electric motor as a general purpose electric motor.

SUMMARY OF THE INVENTION

The following structure is a possible example of typical structure where the motor, the battery, and the driver are provided together into a single unit of the general purpose electric motor.

As shown in FIG. 13A, in a possible implementation, a unit of a general purpose electric motor 110 includes a battery 111 for supplying electrical energy, a motor case 113 accommodating a motor 112, a motor cover 114 covering an opening of the motor case 113, and a driver case 115. As shown in FIG. 13B, in the unit of the general purpose electric motor 110, the battery 111 is attached to the motor case 113. However, since the heat emitting motor 112 and the heat emitting battery 111 are provided adjacent to each other, in the case where continuous operation of the general purpose electric motor (hereinafter referred to as the electric power unit) 110 is performed, it is required to cool the motor 112 and the battery 111 efficiently.

Therefore, an object of the present invention is to provide a technique of efficiently cooling a motor and a battery, in an electric power unit (having components provided together as a single unit).

An electric power unit according to the present invention includes a motor case configured to accommodate a motor, a battery case provided in an extension direction of an output shaft of the motor, and spaced apart from the motor case, and a cooling fan provided between the battery case and the motor case. The battery case includes a discharge port formed at a position facing the cooling fan, and a suction port provided at a position spaced apart from the discharge port.

In the structure, the motor case accommodating the motor, and the battery case provided in the extension direction of the output shaft of the motor, and spaced apart from the motor case, are provided. The cooling fan is provided between the battery case and the motor case. The battery case includes the discharge port formed at the position facing the cooling fan, and the suction port at the position spaced apart from the discharge port. In the structure, by driving the cooling fan, the air in the battery case is discharged from the discharge port of the battery case. Further, by discharging the air in the battery case, the external air is guided from the suction port of the battery case into the battery case. As a result, it is possible to cool the cells (battery) in the battery case.

Further, the air discharged from the inside of the battery case is discharged outward in the radial direction of the cooling fan, and flows along the motor case. Consequently, it is possible to cool the motor through the motor case. By cooling the battery and the motor in this manner, it is possible to operate the electric power unit continuously.

Further, since the battery and the motor are cooled by one cooling fan, structure of the electric power unit can be simplified, and it is possible to reduce the cost of the electric power unit. Further, since the cooling fan is provided in the space between the battery case and the motor case, it is possible to reduce the thickness of the battery case, the motor case, and the cooling fan.

In the above electric power unit, the cooling fan is attached to the output shaft.

In the structure, since the cooling fan is attached to the output shaft, it is possible to simplify the structure much more.

In the electric power unit, the motor case includes a battery dock configured to support the battery case. The battery dock includes a partition wall between the battery case and the cooling fan, and the battery case and the partition wall form a suction channel connecting the suction port to outside.

In the structure, the motor case includes a battery dock for supporting the battery case. The battery dock includes the partition wall between the battery case and the cooling fan, and the battery case and the partition wall form the suction channel connecting the suction port to the outside. Thus, by forming the suction channel by the battery case and the battery dock, and connecting the suction port to the outside by the suction channel, it is possible to guide the external air from the suction port to the inside of the battery case efficiently.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5A is a side view showing the electric power unit according to the present invention;

FIG. 5B is a side view showing an electric power unit according to a comparative example;

DESCRIPTION OF THE PREFERRED EMBODIMENTS

Figure 1:
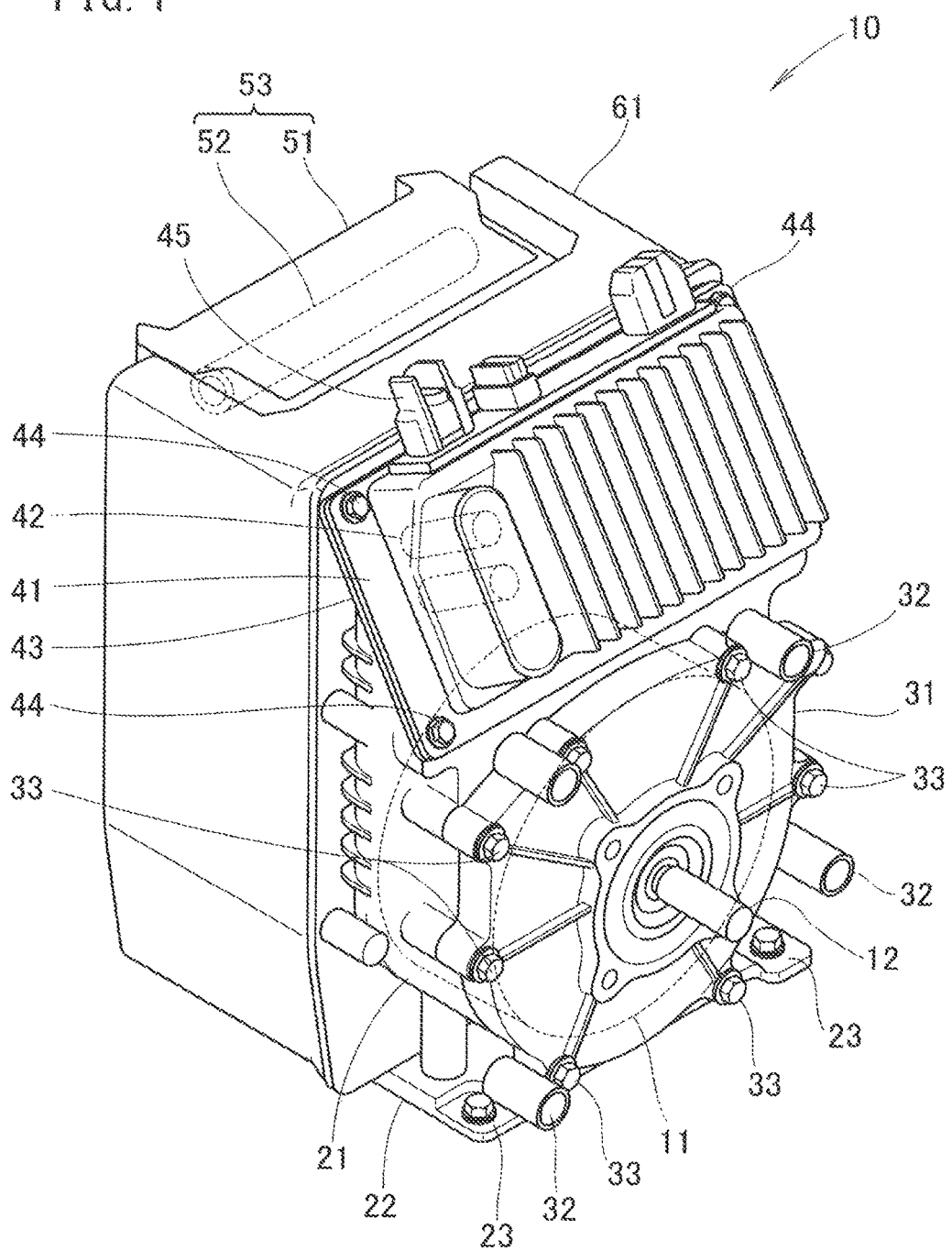
FIG. 1 is a perspective view showing an electric power unit according to the present invention.

Embodiments of the present invention will be described with reference to the accompanying drawings. It should be noted that the drawings should be viewed in the orientation of reference numerals.

Firstly, an embodiment of the present invention will be described with reference to the drawings.

As shown in FIG. 1, an electric power unit 10 includes a motor case 21 accommodating a motor 11, a motor cover 31 covering an opening of the motor case 21, a driver case 41 accommodating a driver 42 for controlling the motor 11, and a battery case 51 accommodating cells 52. The motor cover 31 is attached to the motor case 21 in an axial direction of an output shaft 12 of the motor 11.

A battery pack 53 is made up of the battery case 51 and the cells 52. The battery case 51 is supported by a battery dock 61 covering the substantially half of the battery case 51 in a thickness direction. A plurality of bosses 32 are provided on the front side of the motor cover 31. When the electric power unit 10 is installed upright (vertically), the electric power unit 10 is tightened by these bosses 32.

Figure 2:
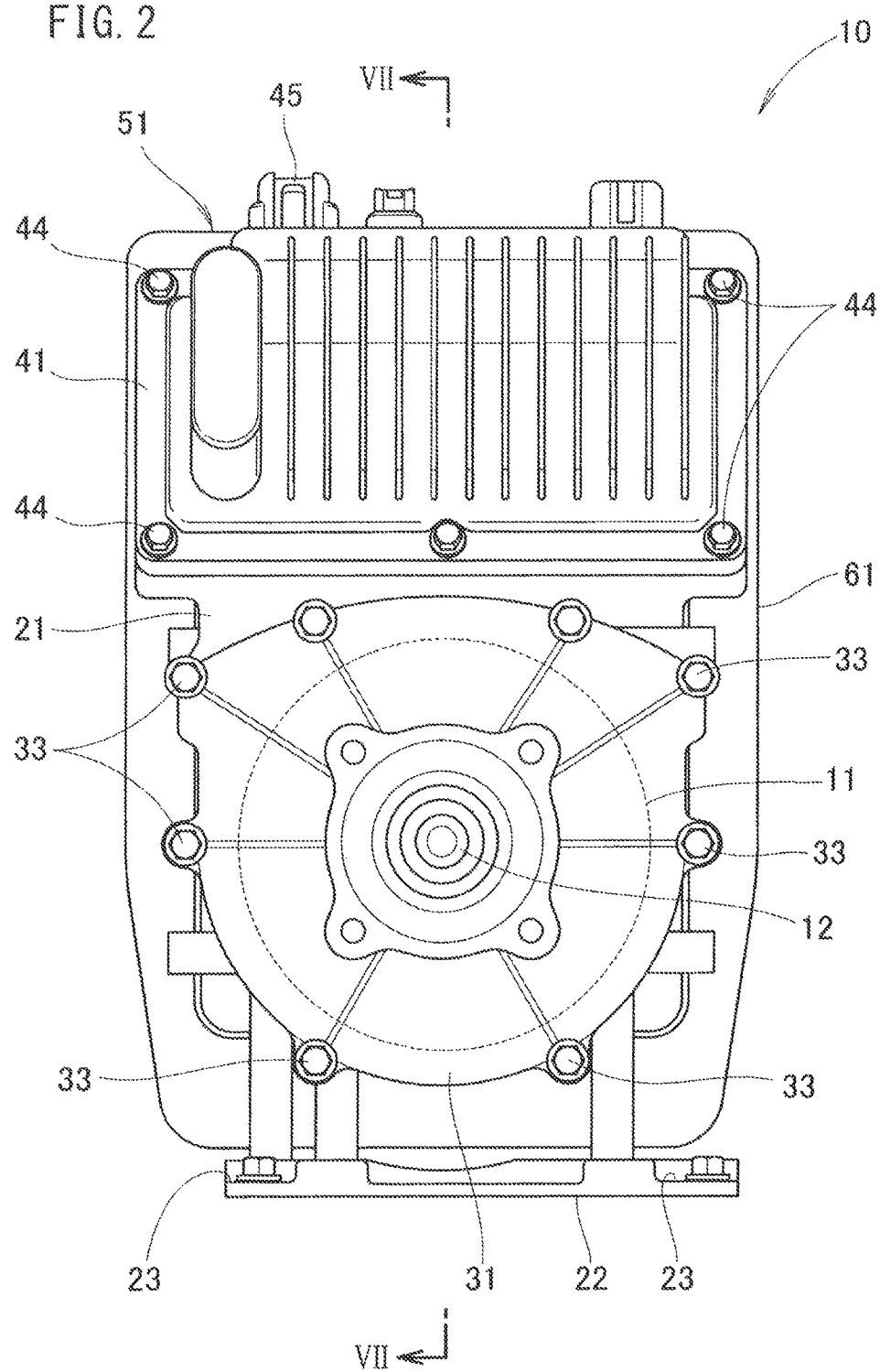
FIG. 2 is a front view showing the electric power unit.

As shown in FIG. 2, the motor cover 31 is tightly fixed to the motor case 21 by first tightening members 33. The lateral width of the motor cover 31 is smaller than the lateral width of the driver case 41. The lateral width of the driver case 41 is equal to, or smaller than the lateral width of the battery dock 61. The driver case 41 is attached to the outer circumferential portion of the motor case 21 in the radial direction of the motor 11.

Further, a motor bed 22 is provided at a lower portion of the motor case 21 in the drawing, for supporting the motor case 21. A plurality of attachment parts 23 are provided at corners of the motor bed 22. When the electric power unit 10 is installed laterally (horizontally), the electric power unit 10 is tightened by these attachment parts 23.

Figure 3:
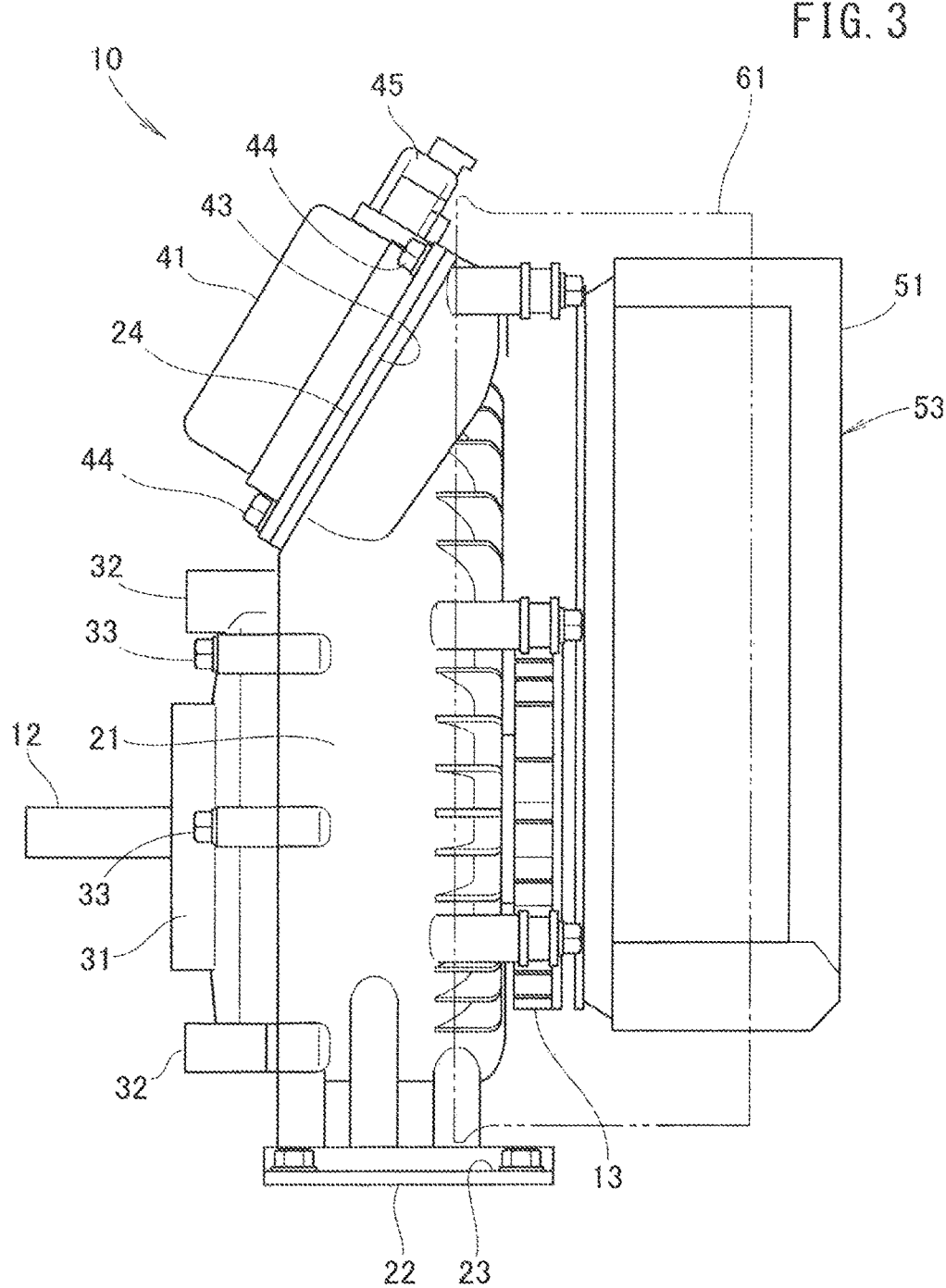
FIG. 3 is a side view showing the electric power unit.

As shown in FIG. 3, the battery case 51 is spaced apart from the motor case 21, in an extension direction of the output shaft 12 through an aseismatic mount. The electric power unit 10 has a cooling fan 13 between the battery case 51 and the motor case 21.

Figure 4:
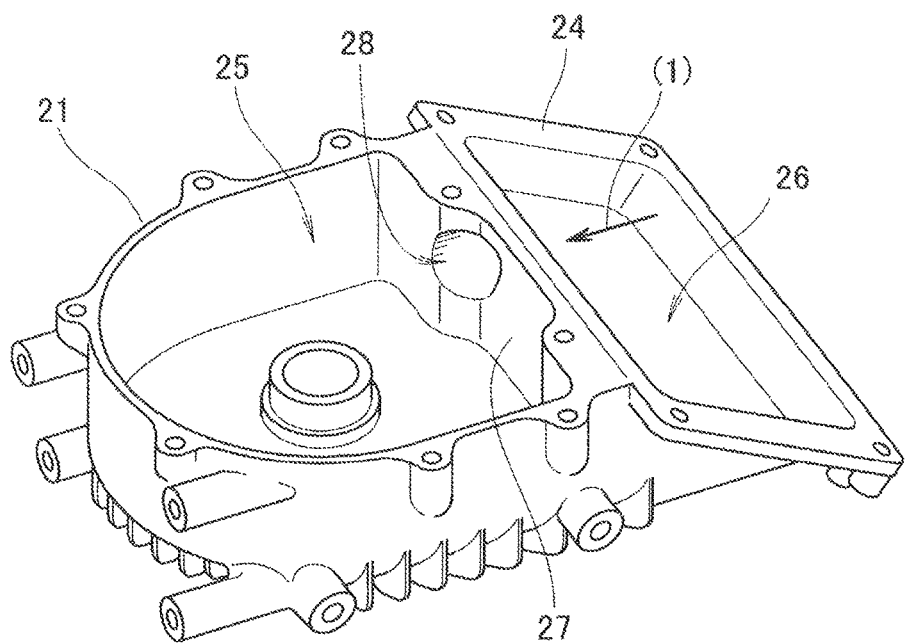
FIG. 4 is a perspective view showing a motor case.

As shown in FIGS. 3 and 4, the driver case 41 is attached to a seal surface 24 of the motor case 21, and the seal surface 24 is inclined downward toward the motor cover 31. A seal surface 43 of the driver case 41 is attached to the seal surface 24 through a seal material. The driver case 41 is tightened to the motor case 21 by second tightening members 44.

By inclining the seal surface 24 of the motor case 21, the seal surface (hereinafter also referred to as the "inclined surface") 24 can have a sufficiently large size. Thus, a seal portion is formed by two members, the motor case 21 and the driver case 41. In the structure, machining operation (so called leveling) to achieve the desired seal performance, i.e., cutting of the mating seal surfaces 24, 43 to improve the precision of the seal surfaces 24, 43 is no longer required. Therefore, it is possible to achieve improvement of the productivity, and consequently, reduction in the machining cost and reduction in the number of components.

Further, by attaching the seal surface 43 of the driver case 41 to the inclined surface 24 of the motor case 21, it is possible to incline the driver case 41 relative to the longitudinal direction of the motor case 21. Thus, it is possible to suppress the height and the thickness of the electric power unit 10 as a whole, and size reduction of the electric power unit 10 is achieved.

Further, since the driver case 41 is attached to the outer circumferential portion of the motor case 21 in the radial direction of the motor 11 (see FIG. 1), the driver case 41 does not protrude forward beyond the motor cover 31, and it is possible to reduce the thickness of the electric power unit 10 much more.

In FIG. 4, the motor case 21 includes a motor storage part 25 accommodating the motor 11 and a driver storage part 26 accommodating a part of the driver 42 (see FIG. 1). An upright wall 27 is formed between the motor storage part 25 and the driver storage part 26. Further, a connection hole 28 is formed in the upright wall 27 for connecting the motor storage part 25 and the driver storage part 26.

By providing the inclined surface 24 on the driver storage part 26 of the motor case 21, machining of the connection hole 28 can be performed by inserting a tool from a direction indicated by an arrow (1) (lateral direction). In the structure, since a wiring path can be formed from the motor storage part 25 by the connection hole 28, components such as a grommet fitted to the connection hole 28 becomes unnecessary.

Next, the dimension in the height direction will be described.

FIG. 5A is a side view showing the electric power unit 10 according to the embodiment. A coupler 45 is provided at an upper portion of the driver case 41. The distance from an upper surface 62 of the battery dock 61 supporting the battery case 51 to an upper end of the coupler 45 is L2.

FIG. 5B is a side view showing an electric power unit 120 according to a comparative example. A driver case 121 is provided above a motor case 122 to extend in parallel to an axial direction of a motor shaft 123. That is, a seal surface 124 of the motor case 122 is not inclined, and forms a plane surface in a direction perpendicular to the axial direction of the motor shaft 123. A coupler 125 is provided at an upper portion of the driver case 121. The distance from an upper surface 128 of a battery dock 127 supporting a battery case 126 to an upper end of the coupler 125 is L3.

Figure 13A:
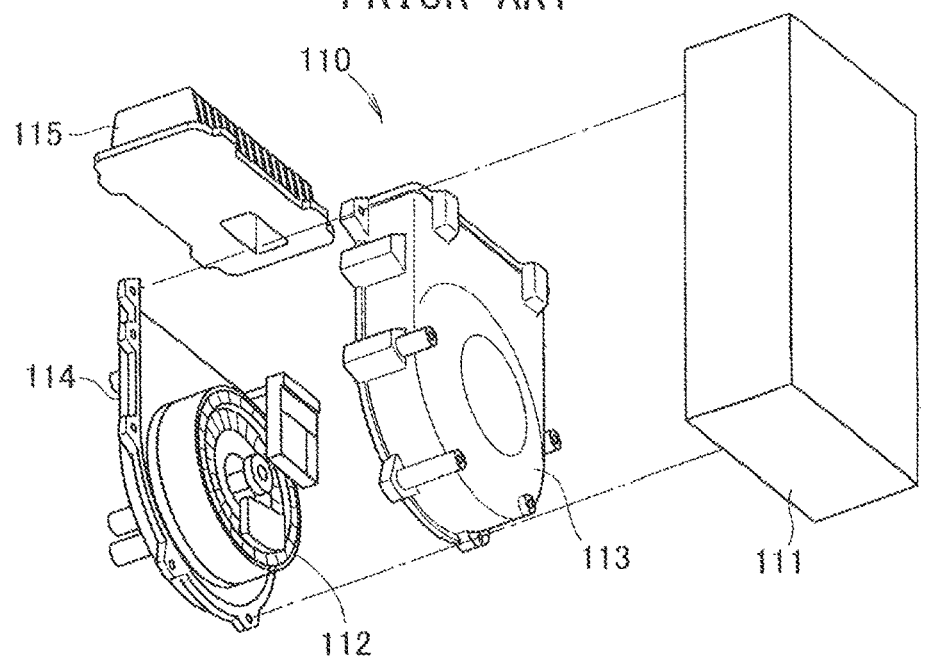
FIG. 13A is an exploded perspective view showing an example of structure of a typical electric power unit.
Figure 13B:
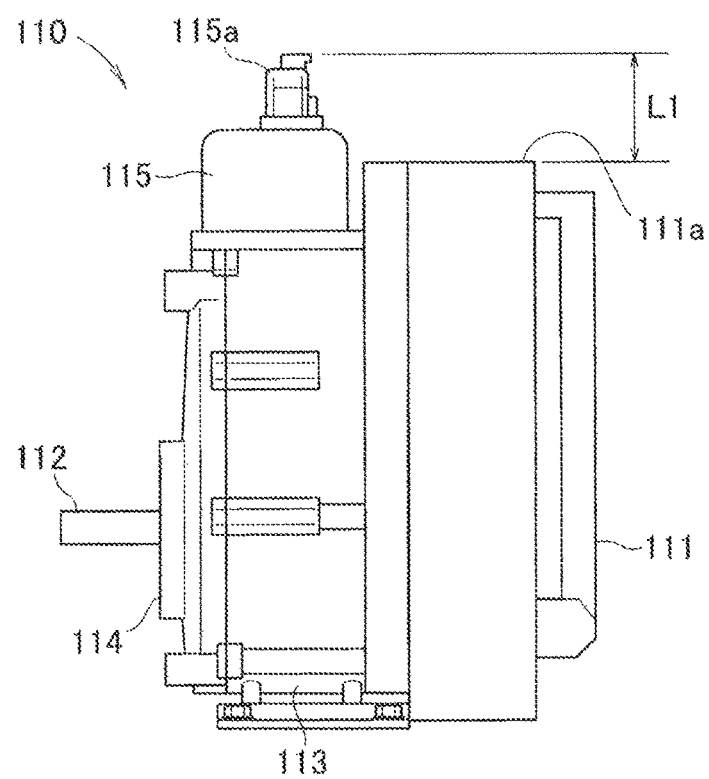
FIG. 13B is a side view showing the electric power unit shown in FIG. 13A.

The distance L2 from the upper surface 62 of the battery dock 61 to the upper end of the coupler 45 according to the embodiment is smaller than the distance L3 from the upper surface 128 of the battery dock 127 to the upper end of the coupler 125 according to the comparative example. Further, the distance L2 from the upper surface 62 of the battery dock 61 to the upper end of the coupler 45 according to the embodiment is smaller than the projection length L1 from an upper surface 111a of the battery 111 to the upper end of a coupler 115a having typical structure shown in FIG. 13. That is, in the structure of the present invention, it is possible to reduce the height of the electric power unit 10 while suppressing the thickness of the electric power unit 10. Consequently, size reduction of the electric power unit 10 is achieved.

Next, an electric power unit 10 according to an embodiment different from that of FIG. 3 will be described. The constituent elements that are identical those shown in FIG. 3 are labeled with the same reference numerals, and detailed description thereof is omitted.

Figure 6:
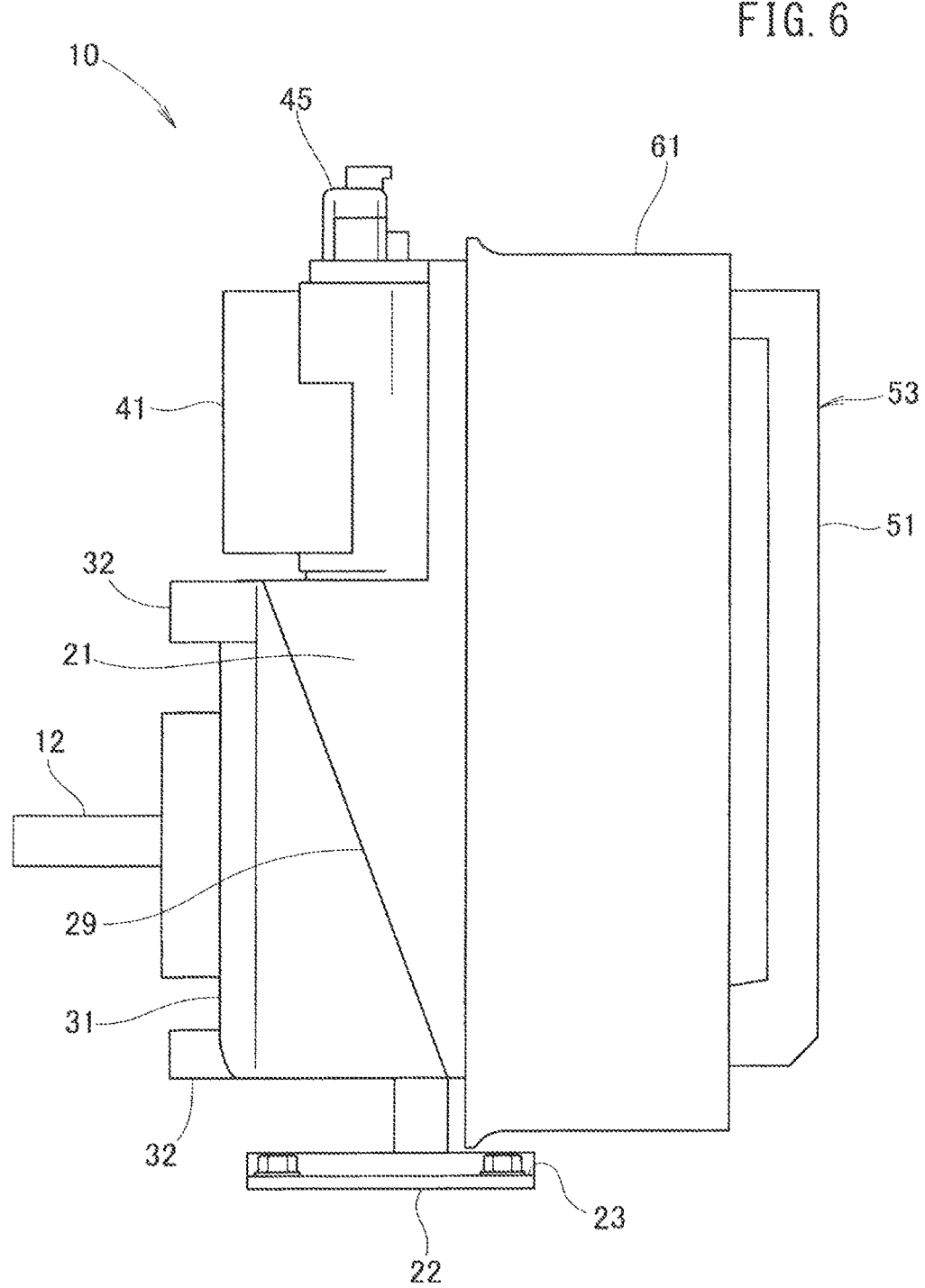
FIG. 6 is a side view showing an electric power unit according to an embodiment different from that shown in FIG. 3.

As shown in FIG. 6, an opening of the motor case 21 is covered by the motor cover 31. A cover attachment part 29 for attaching the motor cover 31 of the motor case 21 is inclined toward the battery case 51 from its upper part to its lower part in a side view. Therefore, the cover attachment part 29 has diagonally split structure where the upper part of the cover attachment part 29 protrudes forward, and the lower part of the cover attachment part 29 is retracted backward.

By adopting the diagonally split structure for the cover attachment part 29, also in the electric power unit 10, as in the case of the typical general purpose engine, it is sufficient to provide necessary attachment holes, the bosses 32, and the motor bed 22, and thus, it is possible to achieve size reduction and weight reduction.

In the typical electric power unit, if a common case is designed for use of both of installation of the electric power unit in the vertical orientation and installation of the electric power unit in the lateral orientation, it becomes necessary to provide unwanted attachment holes or bosses. Consequently, the electric power unit has a large weight. In this regard, in the present invention, the diagonally split structure is adopted for the cover attachment part 29. Therefore, by simply providing the required attachment holes, the bosses 32, and the motor bed 22 for the motor cover 31, the electric power unit 10 can be installed in either the vertical orientation or the lateral orientation. As a result, even in the case where the motor case 21 is used in common for both of installation of the electric power unit 10 in the vertical orientation and installation of the electric power unit 10 in the lateral orientation, it is possible to achieve the size reduction and the weight reduction of the electric power unit 10 as a whole.

Next, internal structure of the electric power unit 10 will be described.

Figure 7:
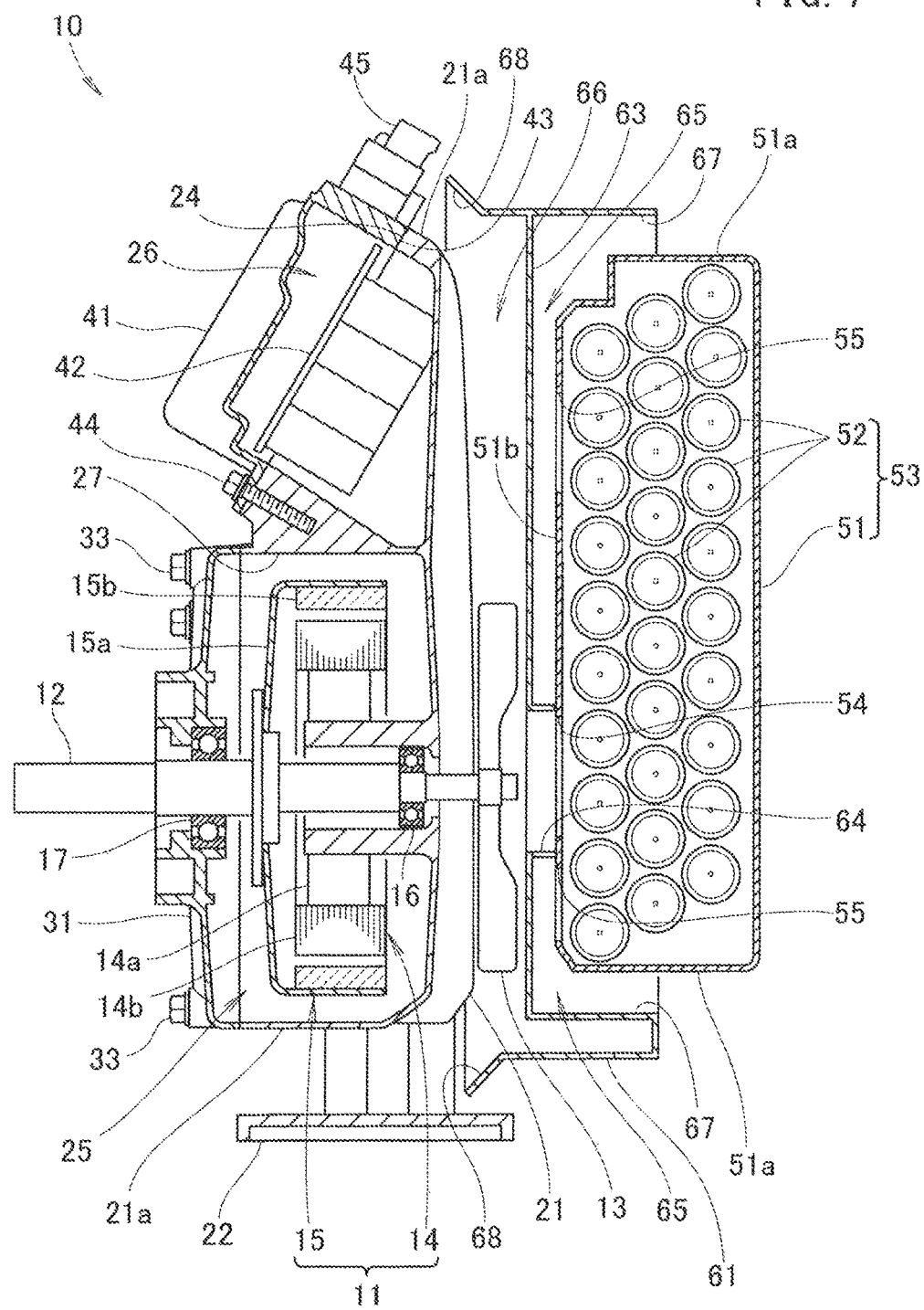
FIG. 7 is a cross sectional view taken along a line VII-VII in FIG. 2.

As shown in FIG. 7, the driver 42 is provided in the driver case 41. A first bearing 16 is provided for the motor case 21. A second bearing 17 is provided for the motor cover 31.

The motor 11 is made up of a stator 14 and a rotor 15. The stator 14 includes a core 14a provided in the motor case 21 and a winding 14b wound around the core 14a. The electrical current of the winding 14b is controlled by the driver 42. The rotor 15 includes the output shaft 12 provided rotatably at the first bearing 16 and the second bearing 17, a yoke 15a provided for the output shaft 12, and a magnet 15b provided for the yoke 15a.

The battery dock 61 includes a partition wall 63 formed along the battery case 51, and a guide pipe 64 provided at a position facing the output shaft 12, and oriented upright from the partition wall 63. The guide pipe 64 is a tunnel-like connection hole connecting the cooling fan 13 side to the battery case 51.

The cooling fan 13 is provided at an end of the output shaft 12 closer to the battery case 51. The cooling fan 13 is provided between the partition wall 63 and the motor case 21. The cooling fan 13 is a centrifugal fan for sending wind from the center to the outward in the radial direction.

Figure 8:
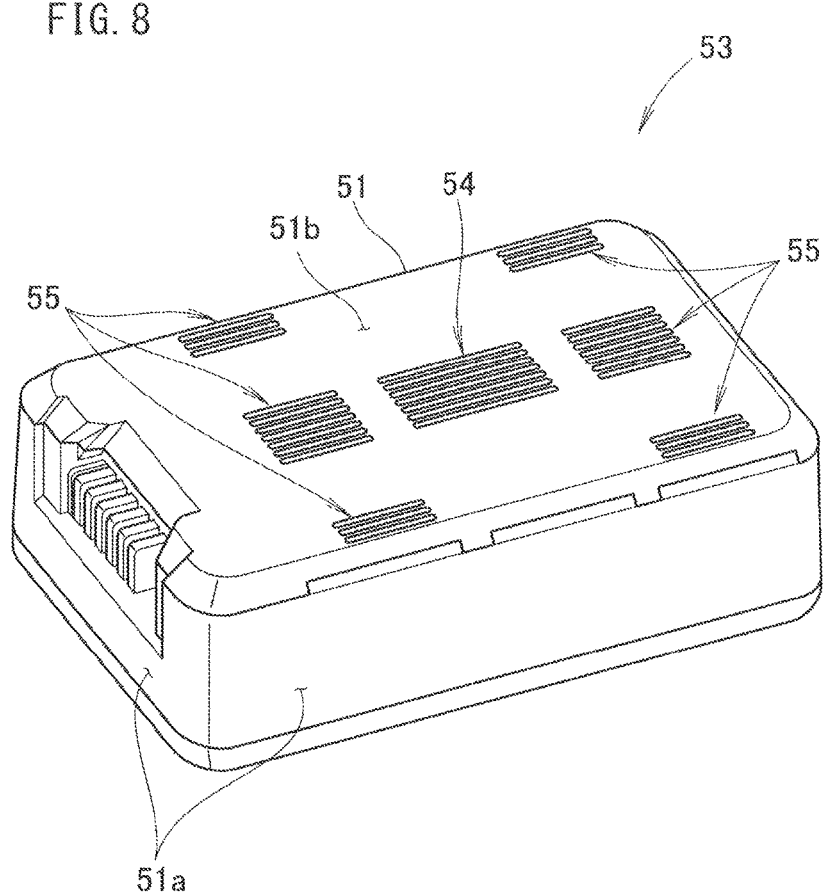
FIG. 8 is a perspective view showing a battery.

As shown in FIGS. 7 and 8, the battery case 51 includes a discharge port 54 formed at a position facing the cooling fan 13, and suction ports 55 provided at positions spaced apart from the discharge port 54. Specifically, the discharge port 54 and the suction ports 55 are formed on a surface 51b of the battery case 51 closer to the motor case 21. In the surface 51b, the discharge port 54 is formed at the center in the lateral direction, and at a lower position in the vertical direction, and the suction ports 55 are formed around the discharge port 54. Each of the discharge port 54 and the suction ports 55 are in the form of a plurality of slits, and can prevent entry of dusts from the outside. A front end of the guide pipe 64 contacts a portion between the suction ports 55 and the discharge port 54.

In FIG. 7, the battery dock 61 has the partition wall 63 between the battery case 51 and the cooling fan 13. The battery case 51 and the partition wall 63 form a suction channel 65 connecting the suction ports 55 to the outside. That is, the suction channel 65 is formed between the partition wall 63 and the battery case 51. Further, a discharge channel 66 is formed between the partition wall 63 and the motor case 21, for connecting the discharge port 54 to the outside.

An inlet 67 of the suction channel 65 is formed on a side surface 51a of the battery case 51 positioned outside the output shaft 12 in the radial direction. Since the inlet 67 is formed to surround the outer circumference of the surface 51b, it is possible to suck the cooling wind efficiently from the suction ports 55 positioned adjacent to the outer circumference of the surface 51b. An outlet 68 of the discharge channel 66 is formed adjacent to a side surface 21a of the motor case 21 positioned outside the output shaft 12 in the radial direction.

A plurality of the cells 52 are formed inside the battery case 51. A small gap is formed between the cells 52 as a passage of the air.

Next, operation of the above electric power unit 10 will be described. For the purpose of explanation, the components of the electric power unit 10 are shown schematically in the drawings.

Figure 9:
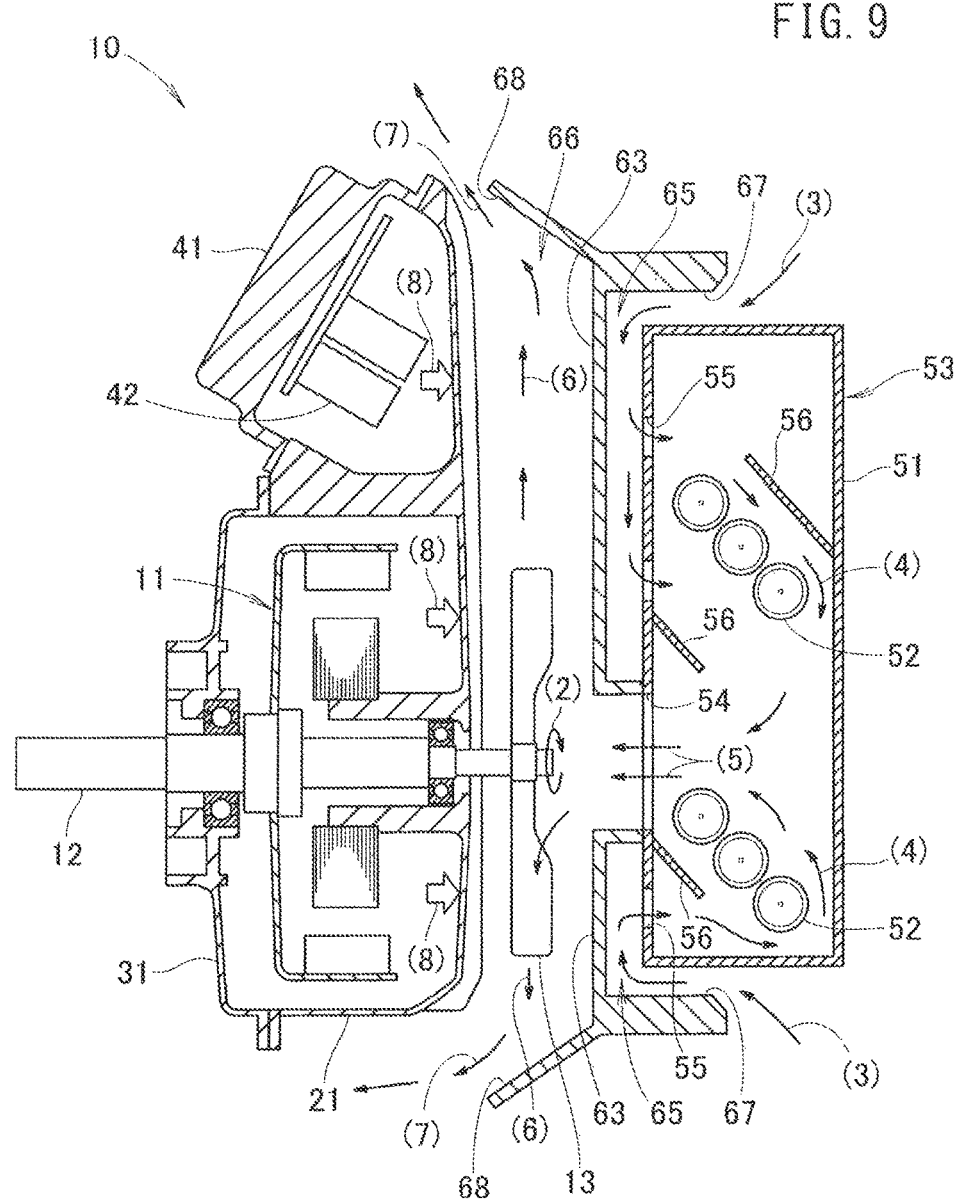
FIG. 9 is an operation diagram showing the electric power unit.

As shown in FIG. 9, the cooling fan 13 is rotated as shown by an arrow (2). The cooling wind is guided from the inlet 67 toward the suction channel 65 as shown by arrows (3), and the cooling wind flows from the suction ports 55 into the battery case 51.

After the cooling wind flows into the battery case 51, the cooling wind flows as shown by arrows (4) to cool the cells (battery) 52. By providing wind guide plates 56 in the battery case 51, the cooling wind flows efficiently, and can cool the cells 52.

The cooling wind flows from the discharge port 54 to the discharge channel 66 as shown by arrows (5), and then, flows as shown by arrows (6) to cool the motor 11 and the driver 42 through the motor case 21. Then, the cooling wind is discharged to the outside from the outlet 68 as shown by arrows (7).

Some of the heat generated from the motor 11 and the heat generated in the driver 42 are transmitted to the wall of the discharge channel 66 of the motor case 21 as shown by arrows (8). The transmitted heat is radiated to the discharge channel 66, and discharged to the outside by the cooling wind as described above. Further, since the majority of the heat generated from the driver 42 is radiated from the driver case 41, and separated from the heat from the motor 11, cooling can be performed efficiently. In the state where the driver case 41 is inclined, the driver case 41 is attached to the motor case 21, and isolated from the motor 11. Therefore, the driver case 41 is not affected by the heat of the motor 11 easily.

As described above, the battery case 51 includes the discharge port 54 formed at a position facing the cooling fan 13, and the suction ports 55 at positions spaced apart from the discharge port 54. In the structure, by driving the cooling fan 13, the air in the battery case 51 is discharged from the discharge port 54 of the battery case 51. Further, by discharging the air in the battery case 51 to the outside, the external air is guided from the suction ports 55 of the battery case 51 into the battery case 51. As a result, it is possible to cool the cells (battery) 52 in the battery case 51.

Further, the air discharged from the inside of the battery case 51 is discharged outward in the radial direction of the cooling fan 13, and flows along the motor case 21 to cool the cells 52 and the motor 11. Therefore, it is possible to operate the electric power unit 10 continuously.

Further, since the cells 52 and motor 11 are cooled by one cooling fan 13 instead of two fans provided respectively for the cells 52 and the motor 11, structure of the electric power unit 10 can be simplified, and cost reduction of the electric power unit 10 can be achieved. The cooling surface of the motor 11 and the cooling surface of the battery 52 are positioned to face each other. In the structure, by the cooling wind from the cooling fan 13 attached to the output shaft 12 outside the motor case 21 to cool the motor 11 and the battery 52, it is possible to reduce the cost of the electric power unit much more.

Further, since the cooling fan 13 is provided in the space between the battery case 51 and the motor case 21, it is possible to reduce the thickness of the battery case 51, the motor case 21, and the cooling fan 13. Moreover, by providing the straight suction channel 65 and the straight discharge channel 66, it is possible to reduce the thickness of the cooling portion to have the same size as a typical general purpose engine 70. Further, since the outlet 68 of the cooling wind is oriented opposite to the inlet 67, the warmed air is not sucked from the inlet 67.

Next, the size of the typical general purpose engine of the electric power unit will be described.

Figure 10:
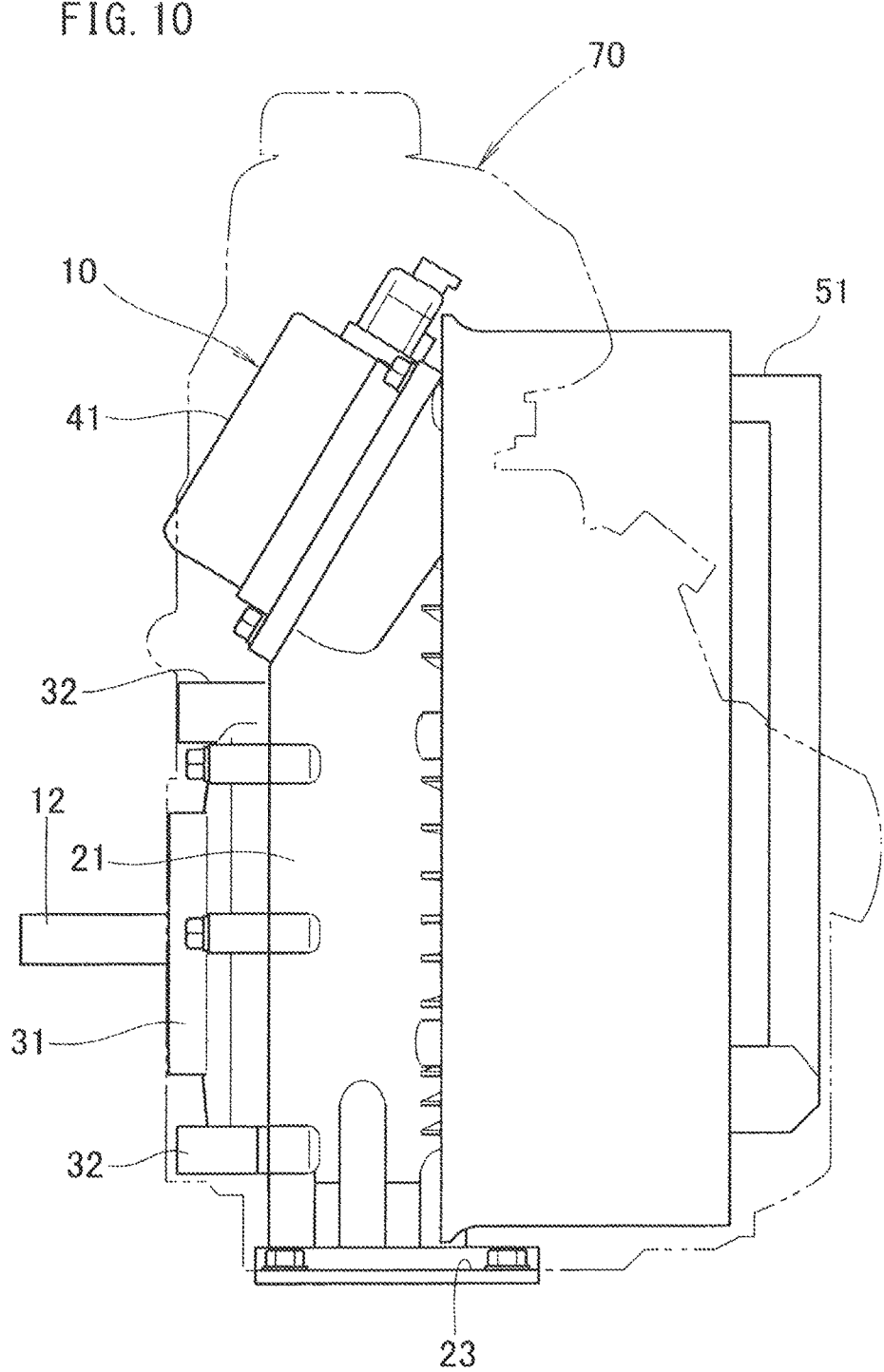
FIG. 10 is a side view showing the electric power unit used as an atomizer.
Figure 11:
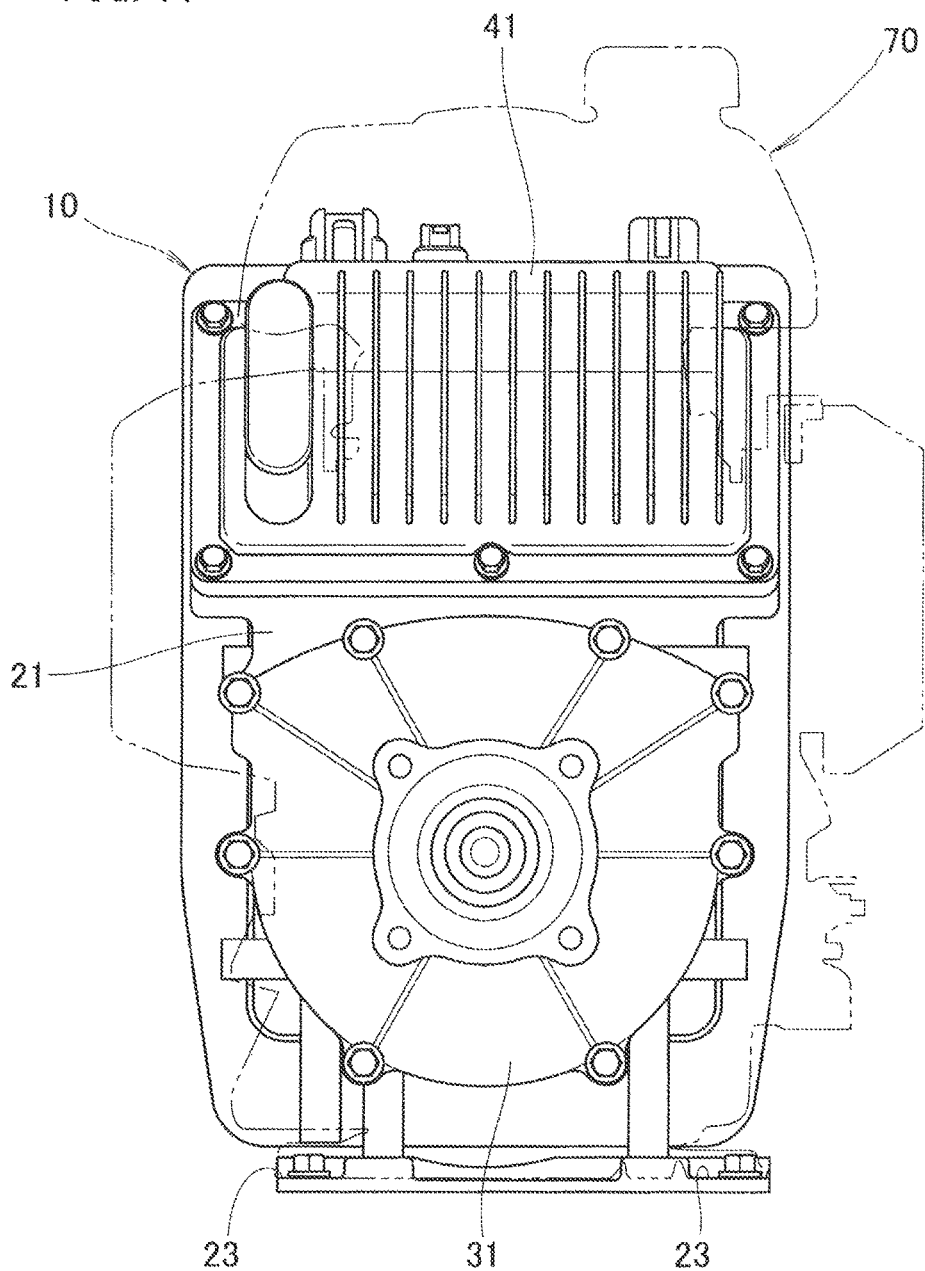
FIG. 11 is a front view showing the electric power unit used as the atomizer.
Figure 12:
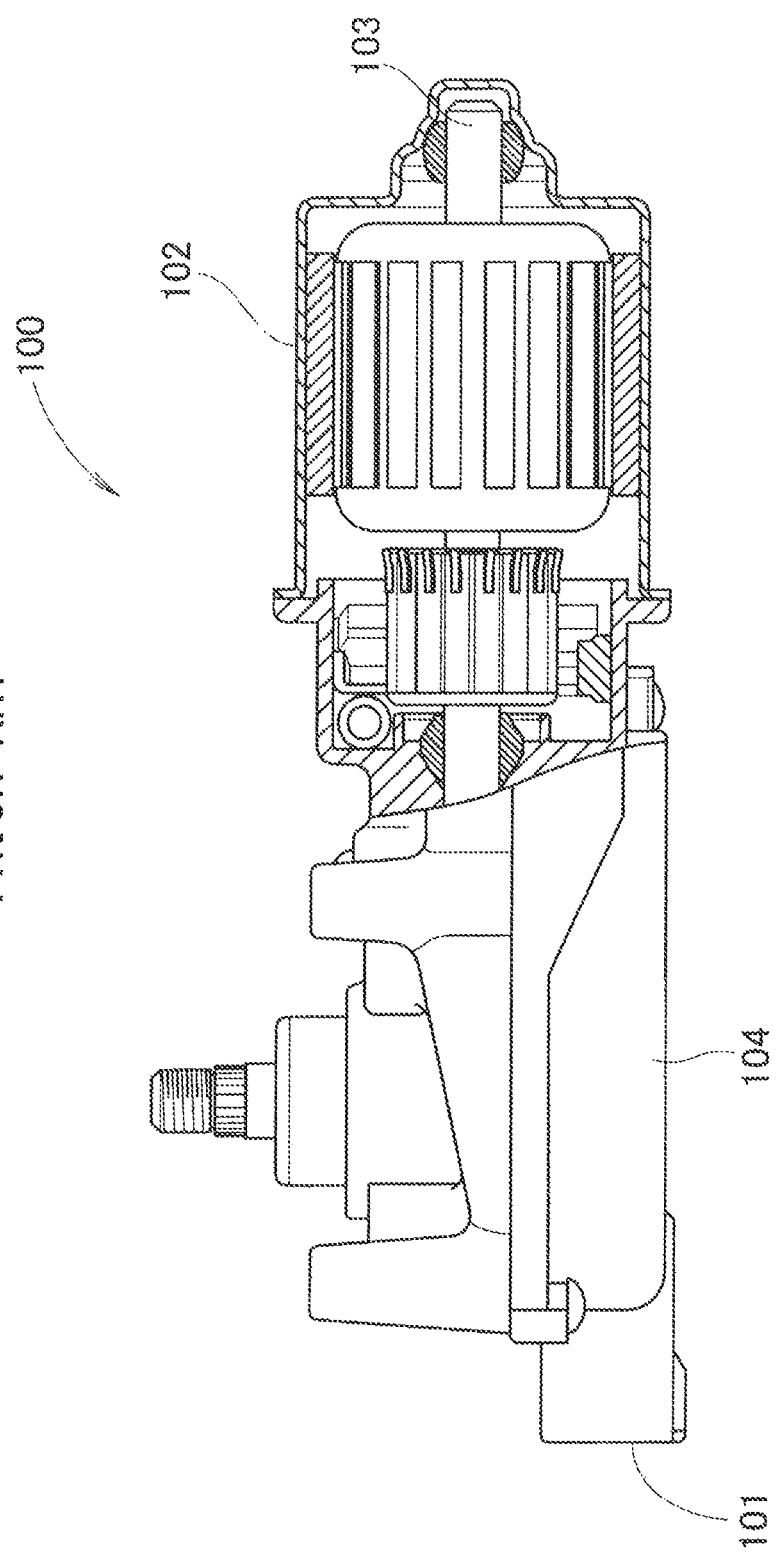
FIG. 12 is a partial cross sectional side view showing an electric motor according to a conventional technique.

In FIGS. 10 and 11, solid lines show the electric power unit 10 according to the present invention, and two dot chain lines show the typical general purpose engine 70. The size of the electric power unit 10 may be substantially the same as the size of the typical general purpose engine 70. Further, since the position of the output shaft 12 is the same as the position of the rotation shaft of the general purpose engine 70, the electric power unit 10 is compatible with the general purpose engine 70.

In the embodiment, the brushless motor of the electric power unit 10 according to the invention adopts an outer rotor type. However, the present invention is not limited in this respect. For example, it may be possible to adopt an inner rotor type. Further, a brush motor may be adopted instead of the brushless motor.

The electric power unit according to the present invention is suitable for the general purpose electric motor.

While the invention has been particularly shown and described with reference to the preferred embodiments, it will be understood that variations and modifications can be effected thereto by those skilled in the art without departing from the scope of the invention as defined by the appended claims.

What is claimed is:

1. An electric power unit comprising:
a motor case configured to accommodate a motor;
a component case configured to accommodate a component to be cooled, the component case provided in an extension direction of an output shaft of the motor, and spaced apart from the motor case;
a centrifugal fan provided between the component case and the motor case; and
a dock configured to support the component case,
wherein the dock includes a partition wall between the component case and the motor case, and the motor case and the partition wall form a discharge channel connecting an outlet to outside, and
the partition wall includes a connection hole formed at a position facing the centrifugal fan.

2. The electric power unit according to claim 1, wherein the centrifugal fan is attached to the output shaft.

3. The electric power unit according to claim 1, wherein the component case includes:
a discharge port formed on a side facing the motor case, and
a suction port provided at a position spaced apart from the discharge port.

4. The electric power unit according to claim 3, wherein the discharge port is formed at a position facing the centrifugal fan.

5. The electric power unit according to claim 1, wherein the dock is formed along the motor case.

6. The electric power unit according to claim 1, wherein the outlet faces in a direction away from the component case, and is provided at a position spaced apart from an inlet.

7. The electric power unit of claim 1, wherein the component to be cooled is a battery, and the battery has a lower endurance temperature than the motor.

* * * * *